United States Patent
Yamashita

(10) Patent No.: US 6,336,062 B1
(45) Date of Patent: Jan. 1, 2002

(54) ATTITUDE ANGLE SENSOR CORRECTING APPARATUS FOR AN ARTIFICIAL SATELLITE

(75) Inventor: Toshiaki Yamashita, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/731,028

(22) Filed: Dec. 7, 2000

(30) Foreign Application Priority Data

Dec. 10, 1999 (JP) .................................................. 11-352397

(51) Int. Cl.$^7$ ...................................................... G06F 17/40
(52) U.S. Cl. .............................. 701/13; 701/14; 244/158; 348/117
(58) Field of Search .................................... 701/13, 14, 4, 701/266; 244/158, 164, 171; 702/5; 348/144, 117

(56) References Cited

U.S. PATENT DOCUMENTS

| | | | | |
|---|---|---|---|---|
| 5,104,217 A | * | 4/1992 | Pleitner et al. ................ | 348/144 |
| 5,467,271 A | * | 11/1995 | Abel et al. .................... | 348/144 |
| 5,596,494 A | * | 1/1997 | Kuo ................................ | 348/144 |
| 6,108,593 A | * | 8/2000 | Pidinsky et al. ............... | 701/13 |
| 6,233,105 B1 | * | 4/2001 | Teague ............................ | 701/13 |
| 6,125,329 A1 | * | 8/2001 | Phoe et al. ..................... | 702/5 |
| 6,275,677 | * | 8/2001 | Tandler .......................... | 701/13 |

FOREIGN PATENT DOCUMENTS

| | | |
|---|---|---|
| JP | 59-229667 | 12/1984 |
| JP | 61-25600 | 6/1986 |
| JP | 1-237411 | 9/1989 |
| JP | 7-329897 | 12/1995 |
| JP | 11-160094 | 6/1999 |

* cited by examiner

Primary Examiner—Richard M. Camby
(74) Attorney, Agent, or Firm—Sughrue Mion, PLLC

(57) ABSTRACT

An attitude angle sensor correcting apparatus for an artificial satellite of the present invention includes a satellite attitude estimator. The satellite attitude estimator reads geographical image data out of an image data memory, produces a GCP (Ground Control Point) position included in the image data by stereo image measurement, and then estimates the instantaneous satellite attitude angle on the basis of a relation between the measured GCP position and a true GCP position. An attitude angle sensor data corrector corrects measured attitude angle data with estimated satellite attitude data output from the satellite attitude estimator and corresponding in time to the measured attitude angle data. The attitude angle sensor data corrector outputs an estimated satellite attitude signal.

6 Claims, 4 Drawing Sheets

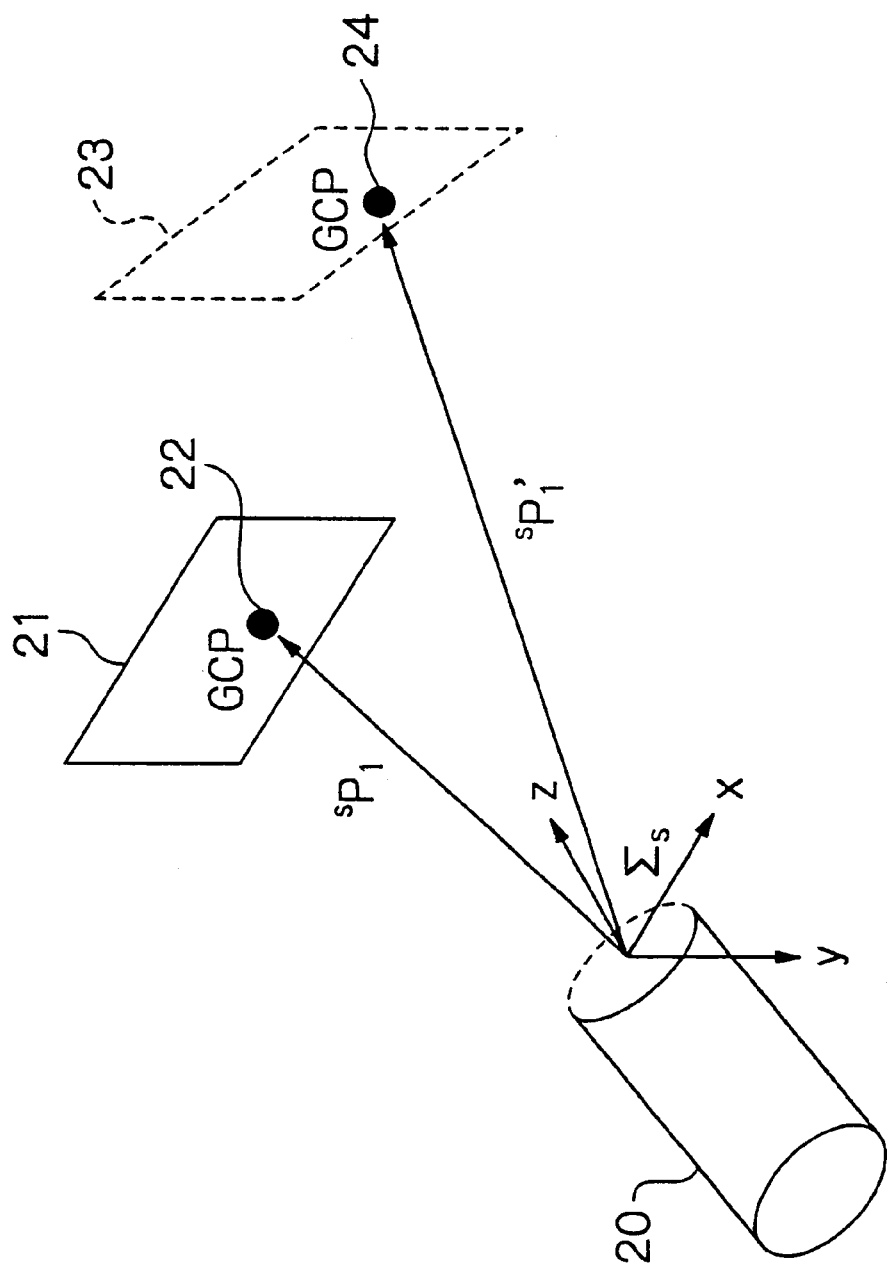

ATTITUDE ANGLE SENSOR CORRECTING APPARATUS FOR AN ARTIFICIAL SATELLITE

BACKGROUND OF THE INVENTION

The present invention relates to an attitude angle sensor correcting apparatus for correcting measured attitude angle data, which is output from an attitude angle sensor mounted on an artificial satellite, with an estimated attitude angle derived from geographical image data.

A conventional attitude angle sensor correcting apparatus for a satellite application includes an attitude angle sensor data memory and an attitude angle sensor noise corrector. The attitude angle sensor noise corrector produces an attitude angle correction signal by using measured attitude angle data read out of the attitude angle sensor data memory. The prerequisite with the attitude angle sensor correcting apparatus is that a positional relation between an attitude angle sensor and the center of gravity of a satellite on which it is mounted is precisely measured and is strictly controlled even in the space. When an error (alignment error) occurs in the attitude angle sensor due to some cause, sensor correction accuracy is critically lowered. Moreover, because a reference value for correcting alignment errors is not available, the detection of alignment errors itself is not practicable.

Technologies relating to the present invention are disclosed in, e.g., Japanese Patent Laid-Open Publication Nos. 59-229667, 1-237411, 7-329897 and 11-160094 as well as in Japanese Patent Publication No. 61-25600.

SUMMARY OF THE INVENTION

It is therefore an object of the present invention to provide an attitude angle sensor correcting apparatus capable of shooting tridimensionally a plurality of GCPs (Ground Control Points) located on the ground with, e.g., a camera, producing estimated satellite attitude data from measured GCP values and true GCP values, and correcting measured attitude angle data with the estimated attitude data to thereby correct attitude angle sensor data.

BRIEF DESCRIPTION OF THE DRAWINGS

The above and other objects, features and advantages of the present invention will become more apparent from the following detailed description taken with the accompanying drawings in which:

FIG. 4 is a view demonstrating GCP correction to be also executed by the satellite attitude estimator.

DESCRIPTION OF THE PREFERRED EMBODIMENTS

Figure 1:
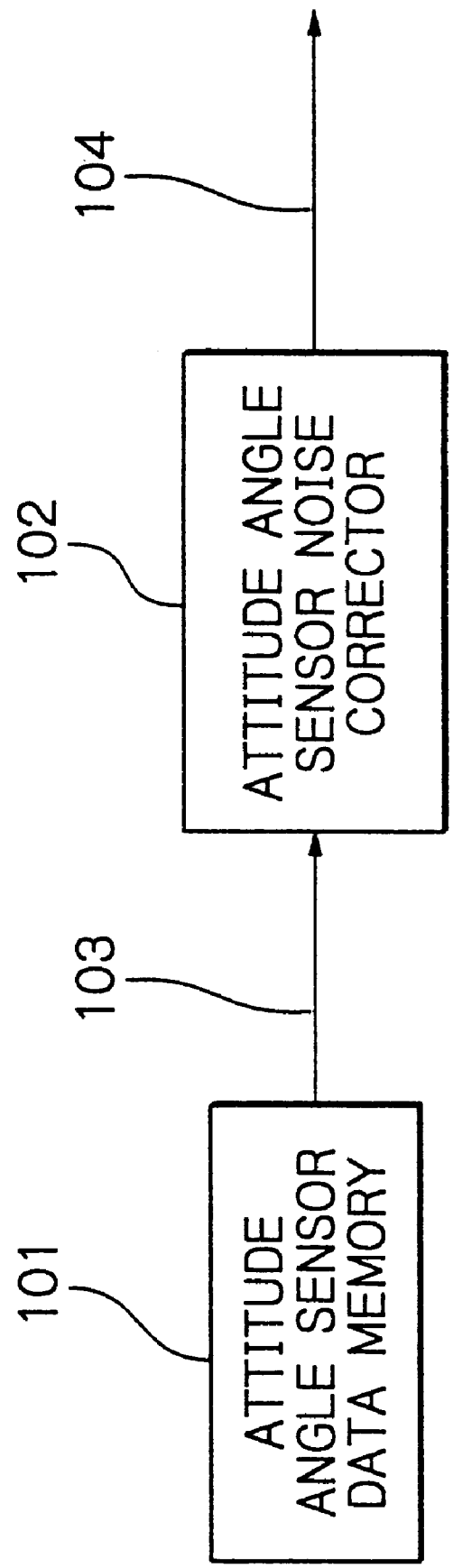
FIG. 1 is a block diagram schematically showing a conventional attitude angle sensor correcting apparatus for an artificial satellite.

To better understand the present invention, brief reference will be made to a conventional attitude angle sensor correcting apparatus mounted on an artificial satellite, shown in FIG. 1. As shown, the apparatus includes an attitude angle sensor data memory 101 and an attitude angle sensor noise corrector 102. Measured attitude angle data 103 is read out of the attitude angle sensor data memory 101. The attitude angle sensor noise corrector 102 outputs an attitude angle correction signal 104.

Specifically, the attitude angle sensor data memory 101 stores the measured attitude angle data 103. The attitude angle sensor noise corrector 102 estimates measurement noise contained in the attitude angle data 103 by using a statistical probability model. The corrector 102 then removes noise components from the attitude angle data 103 and outputs the resulting data in the form of the attitude angle correction signal 104. With this circuitry, the apparatus corrects a measured attitude angle sensor signal.

The correctness of the statistical probability model, or noise model, applied to the attitude angle sensor noise corrector 102 directly effects the accuracy of the attitude angle correction signal 104. As for a sensor noise model, various mathematically outstanding schemes have heretofore been proposed and may be used to enhance accurate estimation to a certain degree.

The prerequisite with the attitude angle sensor correcting apparatus described above is that a positional relation between an attitude angle sensor and the center of gravity of a satellite on which it is mounted is precisely measured and is strictly control led even in the space. Alignment errors critically lower the sensor correction accuracy, as stated earlier. Moreover, because a reference value for correcting alignment errors is not available, the detection of alignment errors itself is not practicable, as also stated previously.

Figure 2:
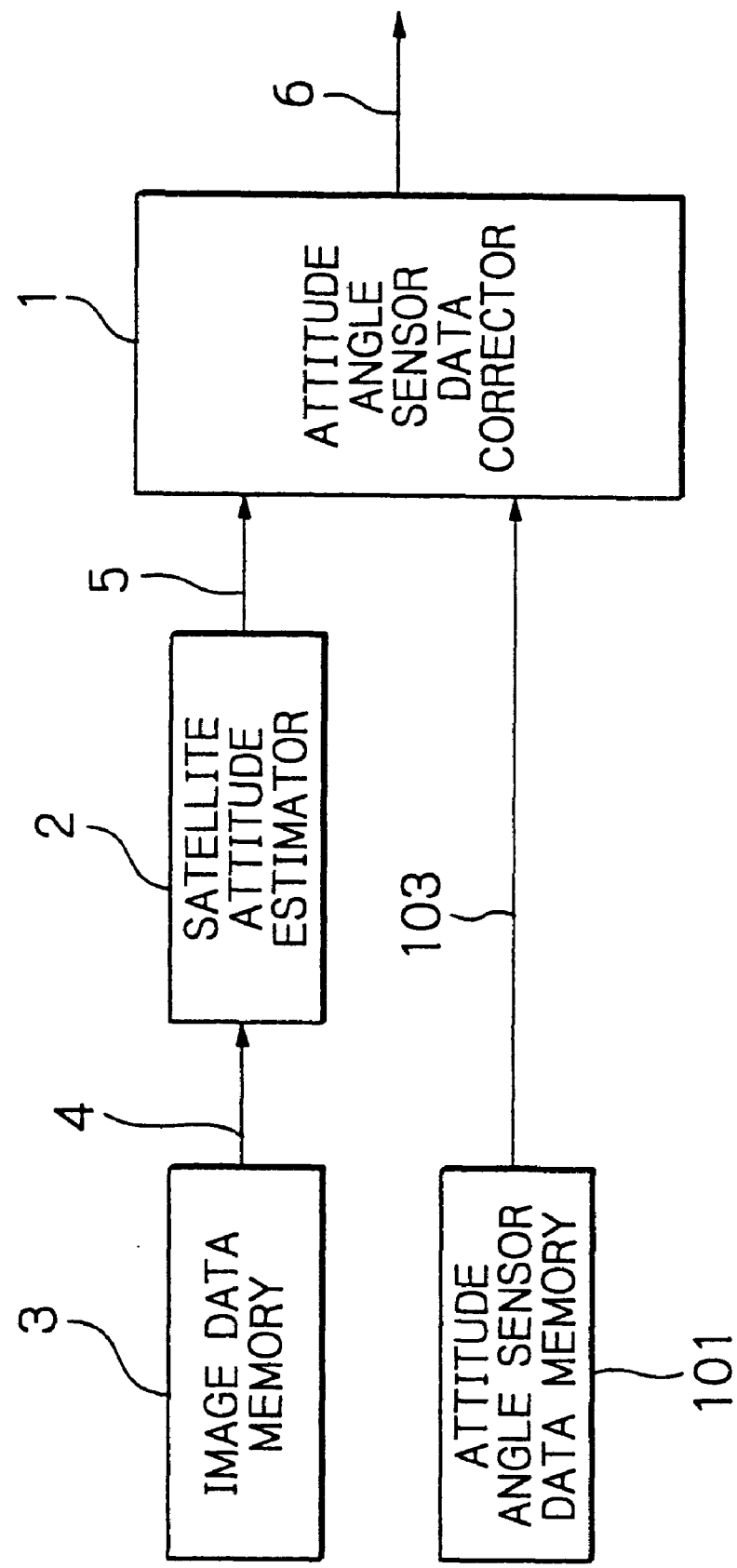
FIG. 2 is a schematic block diagram showing an attitude angle sensor correcting apparatus embodying the present invention.

Referring to FIG. 2, an attitude angle sensor correcting apparatus embodying the present invention and mounted on an artificial satellite will be described. As shown, the apparatus includes an attitude angle sensor data corrector 1, a satellite attitude estimator 2, an image data memory 3, and an attitude angle sensor data memory 101. There are also shown in FIG. 2 geographical shot data 4, estimated satellite attitude data 5, an estimated satellite attitude angle signal 6, and measured attitude angle data 103.

The image data memory 3 stores the geographical shot data 4 representative of a plurality of shots of the same geographical area on the ground where a GCP is located. The satellite attitude estimator 2 reads the data 4 out of the image data memory 3 and determines, by stereo image measurement, the measured position of the GCP contained in the data 4. The estimator 2 then estimates the instantaneous satellite attitude angle on the basis of a relation between the measured position of the GCP and the true position of the same. The estimator 2 feeds the resulting estimated satellite attitude data 5 to the attitude angle sensor data corrector 1. In response, the attitude angle sensor data corrector 1 corrects the measured attitude angle data 103 with the above data 5 coincident in time with the data 103 and then outputs the estimated satellite attitude angle signal 6.

Figure 3:
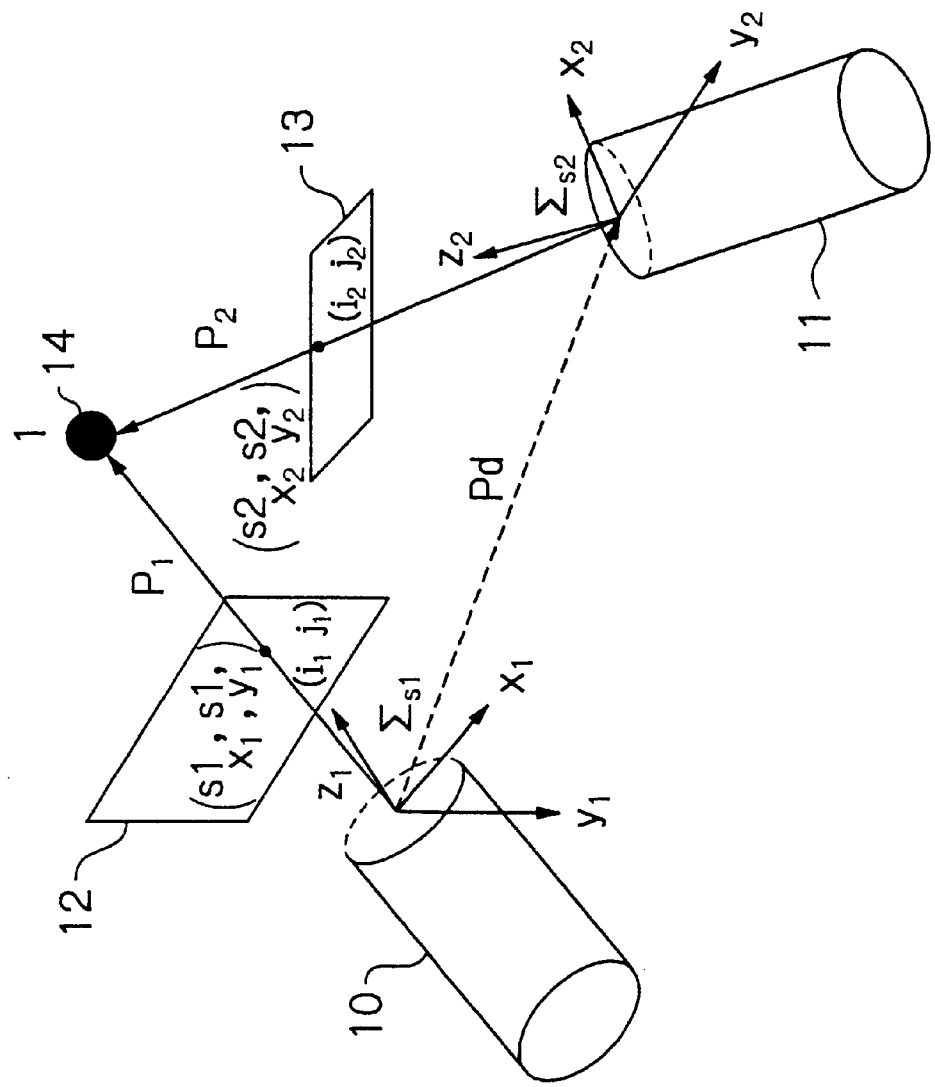
FIG. 3 is a view for describing the principle of stereo image measurement to be executed by a satellite attitude estimator included in the illustrative embodiment.

The stereo image measuring method, which is a specific scheme for measuring the positions of a plurality of GCPs located on the ground, will be described specifically hereinafter. FIG. 3 shows a specific relation between two cameras 10 and 11 different in position from each other and a single point P14 shot by the cameras 10 and 11. In practice, a single camera implements the two cameras 10 and 11 and shoots the single point P14 at different positions to thereby output two different geographical image data. Vectors shown in FIG. 3 derive an equation:

$$P_1 = P_d + P_2 \qquad \text{Eq. (1)}$$

Assume that the cameras 10 and 11 have coordinates $\Sigma_{s1}$ and $\Sigma_{s2}$, respectively, and that the component vectors of the individual vectors are expressed as:

$$^{s1}P_1 = [^{s1}x1 \, ^{s1}y1 \, ^{s1}z1]^T$$

$$^{s2}P_2 = [^{s2}x2 \, ^{s2}y2 \, ^{s2}z2]^T$$

Further, assume that projection points on screens 12 and 13 included in the cameras 10 and 11, respectively, are $(^{s1}x'_1, ^{s1}y'_1)$ and $(^{s2x'}_2, ^{s2Y}_2)$, and that the cameras 10 and 11 both have a focal distance h. Then, there hold the following relations:

$$^{s1}x'_1 = h \frac{^{s1}X_1}{^{s1}z_1}, \quad ^{s1}y'_1 = h \frac{^{s1}y_1}{^{s1}z_1}, \quad \text{Eq. (2)}$$

$$^{s2}x'_2 = h \frac{^{s2}x_2}{^{s2}z_2}, \quad ^{s2}y'_2 = h \frac{^{s2}y_2}{^{s2}z_2}$$

The projection points $(^{s1}x'_1, ^{s1}y'_1)$ and $(^{s2}x'_2, ^{s2}y'_2)$ on the screens 12 and 13 may alternatively be expressed as:

$$^{s1}X'_1 = k_x \frac{i_1}{v_{sx}}, \quad ^{s1}y'_1 = k_y \frac{-j_1}{v_{sy}}, \quad \text{Eq. (3)}$$

$$^{s2}x'_2 = k_x \frac{i_2}{v_{sx}}, \quad ^{s2}y'_2 = k_y \frac{-j_2}{v_{sy}}$$

where $(i_1, j_1)$ and $(i_2, j_2)$ denote pixel values corresponding to the projection points on the screens 12 and 13, respectively, $v_{sx}$ and $v_{sy}$ denote a screen size, and $k_x$ and $k_y$ denote an image size.

Let a DCM (Direct Cosine Matrix) representative of a relation between the coordinates $\Sigma_{s1}$ and $\Sigma_{s2}$ be expressed as:

$$\Sigma_{s2} = {^{s2}C_{s1}} \Sigma_{s1} \quad \text{Eq. (4)}$$

Then, the Eq. (1) may be rewritten as:

$$^{s1}P_1 = {^{s1}P_d} + {^{s2}C_{s1}}^T \, {^{s2}P_2} \quad \text{Eq. (5)}$$

The Eqs. (2) and (5) therefore derive $^{s1}z1$, as follows:

$$^{s1}Z_1 = h \frac{(^{s2}x'_2 c_3 - h c_1)^T \cdot P_d}{(^{s2}x'_2 c_3 - h c_1)^T \cdot s} \quad \text{Eq. (6)}$$

where $$^{s2}C_{s1} = [c_1 c_2 c_3]^T, \quad s = [^{s1}x'_1 \, ^{s1}y'_1 \, h] \quad \text{Eq. (7)}$$

Hereinafter will be described how the satellite attitude estimator 2 generates the estimated satellite attitude data 5 by using a measured GCP position vector $^sP'_1$, which is derived from the image data by the Eqs. (2), (3) and (6), and the true GCP position vector $^sP_1$. FIG. 4 shows the principle of satellite attitude estimation using a GCP. As shown, assume that the vectors $^sP'_1$ and $^sP_1$ are respectively assigned to a GCP 24 in an observed image 23 and a GCP 22 in an actual image 21. Then, the two vectors $^sP'_1$ and $^sP_1$ are related as follows:

$$^sP'_1 = R \, ^sP_1 + \, ^st \quad \text{Eq. (8)}$$

where R denotes a rotational transform matrix, i.e., $RR^T = R^T R = 1$ and $\det R = 1$, and $^st$ denotes a translational transform vector.

The rotational transform matrix R and translational transform vector $^st$ are representative of a difference between the attitudes of the camera 20 with respect to the GCPs 22 and 24. When the camera 23 is affixed to a satellite, the above matrix R and vector $^st$ may directly be interpreted as a difference in the attitude of the satellite.

Further, in an ideal condition wherein disturbance is absent, it is generally possible to precisely calculate the attitude of a satellite from time. Therefore, the true GCP position vector $^sP_1$ indicative of the GCP in the actual image easily derives the attitude value of a satellite in the ideal condition. It follows that if the rotational transform matrix R and translational transform vector st included in the Eq. (8) can be determined on the basis of the two vectors $^sP_1$ and $^sP'_1$, there can be generated the instantaneous estimated satellite attitude data 5.

More specifically, the satellite attitude estimator 2 first executes the stereo image measurement with the geographical shot data 4 in order to produce a measured GCP value based on the Eqs. (2), (3) and (6). The estimator 2 then determines a rotational transform matrix R and a translational transform vector $^st$ that satisfy the Eq. (8) with respect to the measured GCP value and the true GCP value. In this manner, the estimator 2 can generate the estimated satellite attitude data 5 for correcting errors contained in the measured attitude angle data 103.

The estimated satellite attitude data 5 and measured attitude angle data 103 are input to the attitude angle sensor data corrector 1. The attitude angle sensor data corrector 1 detects, by using time information included in the data 5, measured attitude angle data 103 corresponding to the time information, compares the detected data 103 with the estimated satellite attitude data 5, and then corrects the data 103. In this manner, the corrector 1 corrects the data 103 on the basis of information derived from an information source that is entirely different from the attitude angle sensor responsive to the data 103. The corrector 1 therefore successfully removes the noise components of the attitude angle sensor contained in the data 103 and corrects the alignment of the sensor, so that the estimated satellite attitude signal 6 is highly accurate.

In the illustrative embodiment, the positional errors of a camera mounted on a satellite may have critical influence on the correction accuracy of the attitude angle sensor. In practice, however, such errors are smoothed during stereo image measurement and influence the correction accuracy little. The mounting errors of the camera are therefore substantially unquestionable in the aspect of the correction accuracy of the measured attitude angle data 103.

As for the satellite attitude estimator 2, the rotational transform matrix R and translational transform vector $^st$ that satisfy the Eq. (8) can be generated by a Moore-Penrose quasi-inverse matrix. An alternative embodiment of the present invention using this scheme will be described hereinafter.

Assume that n GCP true vectors $^sP_1$, FIG. 4, are present, that a matrix Q having such elements is defined as:

$$Q = \left[ \begin{bmatrix} ^sP1 \\ 1 \end{bmatrix} \begin{bmatrix} ^sP2 \\ 1 \end{bmatrix} \cdots \begin{bmatrix} ^sPn \\ 1 \end{bmatrix} \right] \quad \text{Eq. (9)}$$

and that a matrix Q' constituted by measured GCP vectors $^sP'_1$ is defined as:

$$Q = \left[ \begin{bmatrix} {}^sP'1 \\ 1 \end{bmatrix} \begin{bmatrix} {}^sP'2 \\ 1 \end{bmatrix} \cdots \begin{bmatrix} {}^sP'n \\ 1 \end{bmatrix} \right] \quad \text{Eq. (10)}$$

Then, a simultaneous transform matrix H constituted by the matrix R and vector ${}^s t$ is expressed as:

$$H = Q'Q+ \quad \text{Eq. (11)}$$

$$H = \begin{bmatrix} R & {}^s t \\ o & 1 \end{bmatrix},$$

The Eq. (11) therefore derives a rotational transform matrix R and a translational transform vector ${}^s t$ that indicate a satellite attitude error, which in turn derives estimated satellite data 5.

Further, the satellite attitude estimator 2 may alternatively generate the rotational transform matrix R and translational transform vector ${}^s t$, which satisfy the Eq. (8), in relation to a constant coefficient matrix. Specifically, in another alternative embodiment of the present invention to be described, the estimator 2 generates the above matrix R and vector ${}^s t$ on the basis of the following relation.

In FIG. 4, assume that n true GCP vectors ${}^sP_1$ are present, and that n measured GCP vectors ${}^sP'_1$ corresponding thereto are present. In the embodiment to be described, the following new vectors are defined:

$${}^sW_n = {}^sP_n / {}^sZ_n \quad \text{Eq. (12)}$$

$${}^sW_n = {}^sP'_n / {}^sZ_n \quad \text{Eq. (13)}$$

Let a matrix E be defined as:

$$E = {}^s\tilde{t}R = \begin{bmatrix} e_1 & e_2 & e_3 \\ e_4 & e_5 & e_6 \\ e_7 & e_8 & 1 \end{bmatrix} = \begin{bmatrix} \phi_1^T \\ \phi_2^T \\ \phi_3^T \end{bmatrix} \quad \text{Eq. (14)}$$

where $${}^s\tilde{t} = \begin{bmatrix} 0 & {}^s t_3 & -{}^s t_2 \\ -{}^s t_3 & 0 & {}^s t_1 \\ {}^s t_2 & -{}^s t_1 & 0 \end{bmatrix}$$

Then, the matrix can be unconditionally determined by the following equation:

$$W'(\text{diag}E).W = 0 \quad \text{Eq. (15)}$$

where $$W = [{}^sW_1 {}^sW_2 \ldots {}^sW_n],$$

$$W' = [{}^sW'_1 {}^sW'_2 \ldots {}^sW'_n]$$

Let the matrix produced by the Eq. (15) be expressed, by singular value resolution, as:

$$E = U\Lambda V^T \quad \text{Eq. (16)}$$

Then, the matrix R and vector ${}^s t$ can eventually be determined by:

$$R = U \begin{bmatrix} 0 & \pm 1 & \\ \pm 1 & 0 & \\ & & s \end{bmatrix} V^T, s = (\det U)(\det V) \quad \text{Eq. (17)}$$

$${}^s t = \alpha \begin{bmatrix} \phi_1^T \phi_2 / \phi_2^T \phi_3 \\ \phi_1^T \phi_2 / \phi_1^T \phi_3 \\ 1 \end{bmatrix} \quad \text{Eq. (18)}$$

where α denotes any desired constant.

With the Eqs. (17) and (18), it is possible to determine a rotational transform matrix R and a translational transform vector ${}^s t$ indicative of a satellite attitude error in the same manner as in the immediately preceding embodiment. The matrix R and vector ${}^s t$ derive estimated satellite attitude data 5, as stated earlier.

The difference between this embodiment and the immediately preceding embodiment as to the rotational transform matrix R and translational transform vector ${}^s t$ will be described more specifically by using specific numerical values. Assume that the following eight GCPs exist in any desired geographical data 4:

$${}^sP_1 = [6.2\ 26.8\ 0.5\ ]^T, {}^sP_2 = [-6.5\ 20.1\ 0.08]^T$$

$${}^sP_3 = [7.6\ -30.8\ 10.6]^T, {}^sP_4 = [-0.8\ -28.2\ 3.1]^T$$

$${}^sP_5 = [10.7\ 34.3\ 16.1]^T, {}^sP_6 = [9.3\ -18.6\ 0.15]^T$$

$${}^sP_7 = [-17.2\ 30.1\ 9.5]^T, {}^sP_8 = [16.1\ 24.7\ 2.9]^T \quad \text{Eq. (19)}$$

A true rotational transform matrix R and a translational transform vector ${}^s t$ corresponding to the above GCPs are given by:

$$R = \begin{bmatrix} 0.99848 & -0.01562 & -0.05291 \\ 0.01742 & 0.99927 & 0.03398 \\ 0.05234 & -0.03485 & 0.99802 \end{bmatrix}, {}^s t = \begin{bmatrix} -81 \\ 31 \\ -24 \end{bmatrix} \quad \text{Eq. (20)}$$

Values produced by applying the transform of the Eq. (20) to the Eq. (19) and containing suitable noise are assumed to be measured GCP points ${}^sP'_1, {}^sP'_2, {}^sP'_3, {}_sP'_4, {}^sP'_5, {}^sP'_6, {}^sP'_7$ and ${}^sP'_8$. Then, the previous embodiment produces an estimated rotational transform matrix $R_1$ and an estimated translational transform vector ${}^s t_1$:

$$R_1 = \begin{bmatrix} 0.99648 & -0.01611 & -0.05264 \\ 0/01743 & 0.99927 & 0/03398 \\ 0.05276 & -0.03444 & 0/99568 \end{bmatrix}, \quad \text{Eq. (21)}$$

$$\det R_1 = 0.99567, {}^s t_1 = \begin{bmatrix} -80.97565 \\ 31.0 \\ -23.97823 \end{bmatrix}$$

Likewise, the illustrative embodiment produces an estimated rotational transform matrix R and an estimated translational transform vector ${}^s t_2$:

$$R_2 = \begin{bmatrix} 0.99595 & -0.01225 & -0.08907 \\ 0.00772 & 0.99866 & -0.0511 \\ 0.08957 & 0.05020 & 0.99471 \end{bmatrix}, \quad \text{Eq. (22)}$$

$$\det R_2 = 1, {}^s t_2 = \begin{bmatrix} -29.53341 \\ 38.34762 \\ -26.40867 \end{bmatrix}$$

As the Eqs. (21) and (22) indicate, the two embodiments are capable of estimating the rotational transform matrix R and translational transform vector $^s t$ with acceptable accuracy with respect to true values although they include some errors as to numerical values.

As stated above, in accordance with the present invention, an image data memory stores two different geographical shot data representative of the same geographical area, where a GCP is set, shot at two different points. A satellite attitude estimator reads the shot data out of the image data memory, determines the position of the GCP included in the image data by stereo image measurement, and estimates the instantaneous attitude angle of a satellite by referencing a relation between the determined GCP position and a true GCP position. The estimated satellite attitude angle is input to an attitude angle sensor data corrector as estimated satellite attitude data. In response, the attitude angle sensor data corrector corrects measured attitude angle data output from an attitude angle sensor data memory with the estimated satellite attitude data corresponding in time to the measured data.

The attitude angle sensor may be implemented by the integrated value of a gyro signal, STT or an earth sensor by way of example. Also, the image data can be easily attained with a camera mounted on a satellite.

In summary, the present invention provides an attitude angle sensor correcting apparatus for an artificial satellite having the following unprecedented advantages. The correcting apparatus includes an image data memory, an attitude angle estimator, and an attitude angle sensor data corrector. The correcting apparatus can therefore remove both of sensing errors ascribable to random noise and bias noise, which are particular to an attitude angle sensor, and the alignment errors of the sensor mounted on a satellite, thereby determining an attitude angle with utmost accuracy. The correcting apparatus further promotes the accurate determination of an attitude angle by producing measured GCP values by executing stereo image measurement with geographical shot data.

Various modifications will become possible for those skilled in the art after receiving the teachings of the present disclosure without departing from the scope thereof.

What is claimed is:

1. An attitude angle correcting apparatus for an artificial satellite, comprising:

an attitude angle sensor data memory for storing a signal output from sensing means responsive to an attitude angle of the artificial satellite;

an image data memory for storing geographical image data representative a same geographical area, where a (Ground Control Point) GCP is located, shot at a plurality of positions;

a satellite attitude estimator for generating estimated attitude data of the artificial satellite on the basis of a difference between a true GCP value representative of a true position of the GCP and a measured GCP value produced by image measurement using said geographical image data stored in said image data memory; and an attitude angle sensor data corrector for estimating an attitude angle of the artificial satellite by using said estimated attitude data, and then correcting measured attitude angle data, which is read out of said attitude angle sensor data memory, with said attitude angle estimated to thereby generate an estimated attitude angle signal.

2. An apparatus as claimed in claim 1, wherein a plurality of GCPs (Ground Control Points) are located on geometry represented by said geometrical image data.

3. An apparatus as claimed in claim 2, wherein said satellite attitude estimator estimates an attitude angle of the artificial satellite by describing, for each of the GCPs whose positions can be measured on the basis of said geographical image data and whose true values are known, a relation between the measured GCP value and the true GCP value by use of a Moor-Penrose quasi-inverse matrix.

4. An apparatus as claimed in claim 2, wherein when said satellite attitude estimator relates the measured value and the true value of each of the GCPs, positions of which can be measured on the basis of the geographical image data and true values of which are known, by using a constant coefficient matrix:

$$E = \begin{bmatrix} e_1 & e_2 & e_3 \\ e_4 & e_5 & e_6 \\ e_7 & e_8 & 1 \end{bmatrix}$$

said satellite attitude estimator estimates an attitude angle error of the artificial satellite by using a result of singular value resolution of said constant coefficient matrix.

5. An apparatus as claimed in claim 1, wherein said satellite attitude estimator estimates an attitude angle of the artificial satellite by describing, for each of the GCPs whose positions can be measured on the basis of said geographical image data and whose true values are known, a relation between the measured GCP value and the true GCP value by use of a Moor-Penrose quasi-inverse matrix.

6. An apparatus as claimed in claim 1, An apparatus as claimed in claim 2, wherein when said satellite attitude estimator relates the measured value and the true value of each of the GCPs, positions of which can be measured on the basis of the geographical image data and true values of which are known, by using a constant coefficient matrix:

$$E = \begin{bmatrix} e_1 & e_2 & e_3 \\ e_4 & e_5 & e_6 \\ e_7 & e_8 & 1 \end{bmatrix}$$

said satellite attitude estimator estimates an attitude angle error of the artificial satellite by using a result of singular value resolution of said constant coefficient matrix.

* * * * *